(12) United States Patent
Keshavarzian et al.

(10) Patent No.: US 7,978,666 B2
(45) Date of Patent: Jul. 12, 2011

(54) NODE CONTROL IN WIRELESS SENSOR NETWORKS

(75) Inventors: Abtin Keshavarzian, Palo Alto, CA (US); Lakshmi Venkatraman, Palo Alto, CA (US); Huang Lee, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 11/264,797

(22) Filed: Oct. 31, 2005

(65) Prior Publication Data

US 2007/0097895 A1 May 3, 2007

(51) Int. Cl.
*H04W 4/00* (2009.01)

(52) U.S. Cl. ........ 370/338; 370/329; 370/310; 370/328; 370/311; 370/252; 370/235; 370/255; 370/351; 455/422.1; 455/519; 455/448; 455/443

(58) Field of Classification Search ............... 455/422.1, 455/443, 448, 519; 370/338, 329, 253, 351, 370/310, 328, 311, 252, 255, 235
See application file for complete search history.

(56) References Cited

U.S. PATENT DOCUMENTS

| | | | |
|---|---|---|---|
| 6,192,230 B1 * | 2/2001 | van Bokhorst et al. | 455/343.3 |
| 6,292,508 B1 * | 9/2001 | Hong et al. | 375/134 |
| 6,414,955 B1 * | 7/2002 | Clare et al. | 370/390 |
| 6,519,460 B1 * | 2/2003 | Haartsen | 455/452.1 |
| 6,542,495 B1 * | 4/2003 | Sugita | 370/347 |
| 6,622,022 B1 * | 9/2003 | Du | 455/502 |
| 6,804,542 B1 * | 10/2004 | Haartsen | 455/574 |
| 6,937,158 B2 * | 8/2005 | Lansford et al. | 340/825.22 |
| 7,020,501 B1 * | 3/2006 | Elliott et al. | 455/574 |
| 7,412,265 B2 * | 8/2008 | Chen et al. | 455/574 |
| 2003/0099221 A1 * | 5/2003 | Rhee | 370/338 |
| 2003/0152041 A1 * | 8/2003 | Herrmann et al. | 370/310 |
| 2003/0236866 A1 * | 12/2003 | Light | 709/220 |
| 2004/0125776 A1 * | 7/2004 | Haugli et al. | 370/338 |

(Continued)

FOREIGN PATENT DOCUMENTS

EP 1473870 A2 11/2004

OTHER PUBLICATIONS

Lu Gang, et al., "An Adaptive Energy-Efficient and Low-Latency MAC for Data Gathering in Wireless Sensor Networks", Proceedings of the 18th International Parallel and Distributed Processing Symposium (IPDS'04), 2004, p. 224.

(Continued)

*Primary Examiner* — Kwasi Karikari
(74) *Attorney, Agent, or Firm* — Dergosits & Nosh LLP; Geoffrey T. Staniford

(57) ABSTRACT

Network node control is described that includes node wakeup scheduling that reduces the energy consumption of levels of nodes and reduces the delay of information transfer through the network. The node wakeup scheduling includes a crossed ladder pattern that combines two wakeups in one level. The node wakeup scheduling also includes an adaptive version of the crossed ladder pattern that changes the wakeup patterns of the crossed ladder over time to provide uniform energy savings. The network node control also includes the use of multiple trees to transfer information through a network. This multi-parent node assignment assigns multiple parents with different wakeup schedules to each node in the network. This multi-parent assignment reduces the delay in transmission of information through the network and also increases energy efficiency in the nodes.

16 Claims, 12 Drawing Sheets

U.S. PATENT DOCUMENTS

| | | | |
|---|---|---|---|
| 2004/0190467 A1* | 9/2004 | Liu et al. | 370/311 |
| 2004/0230638 A1* | 11/2004 | Balachandran et al. | 709/200 |
| 2004/0264397 A1* | 12/2004 | Benveniste | 370/311 |
| 2005/0018624 A1* | 1/2005 | Meier et al. | 370/318 |
| 2005/0047358 A1* | 3/2005 | Pattabiraman et al. | 370/311 |
| 2005/0122231 A1 | 6/2005 | Varaiya et al. | |
| 2005/0122927 A1* | 6/2005 | Wentink | 370/311 |

OTHER PUBLICATIONS

Li Yuan, et al., "Energy and Latency Control in Low Duty Cycle MAC Protocols", Wireless Communications and Networking Conference, 2005 IEEE New Orleans, LA, USA, Mar. 13-17, 2005, Piscataway, NJ, USA, IEEE, Mar. 13, 2005, pp. 676-682.

Search Report dated Feb. 15, 2011.

J. Jobin, et al., "A Lightweight Framework for Source-to-Sink Data Transfer in Wireless Sensor Networks", Broadband Networks, IEEE 2005 2nd International Conference on Boston, MA, Oct. 3-7, 2005, pp. 756-766.

W. Ye, et al., "Medium Access Control with Coordinated Adaptive Sleeping for Wireless Sensor Networks", IEEE/ACM Transactions on Networking, IEEE/ACM, New York, NY, vol. 12, No. 3, Jun. 1, 2004, pp. 493-506.

* cited by examiner

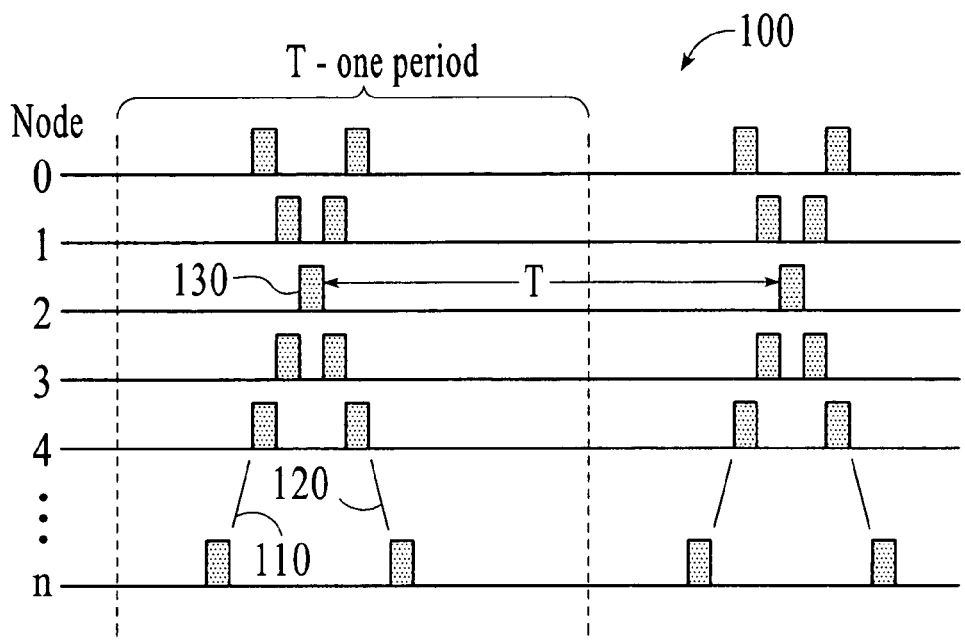
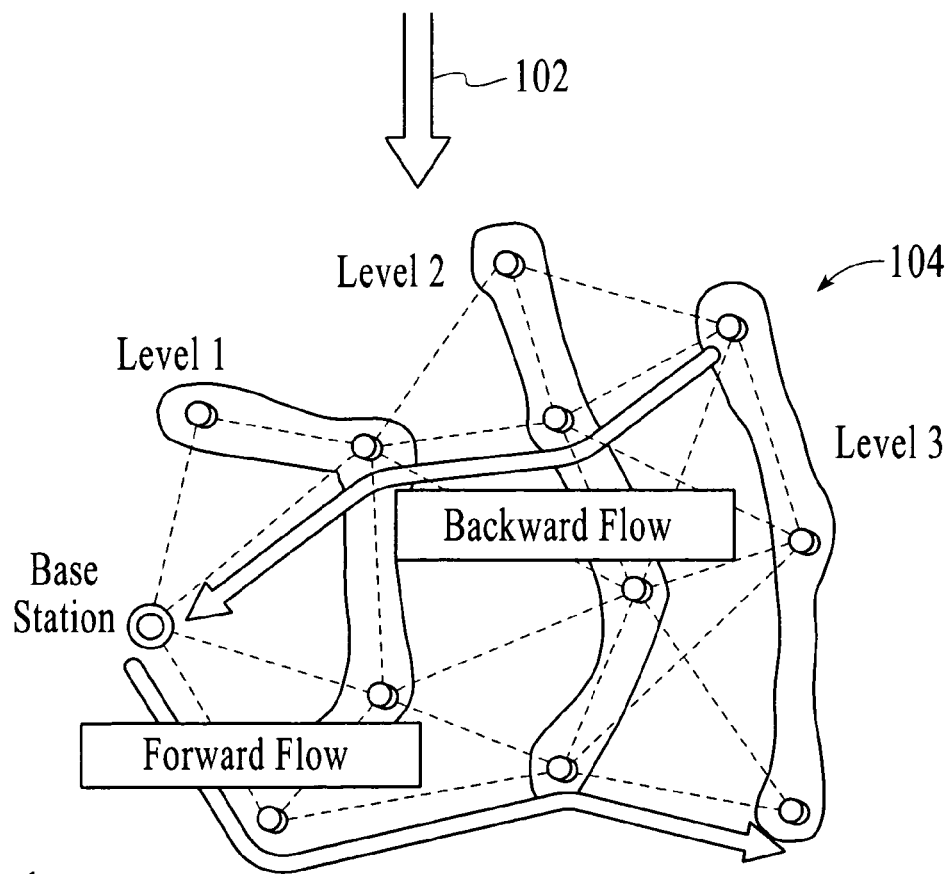
FIG.1

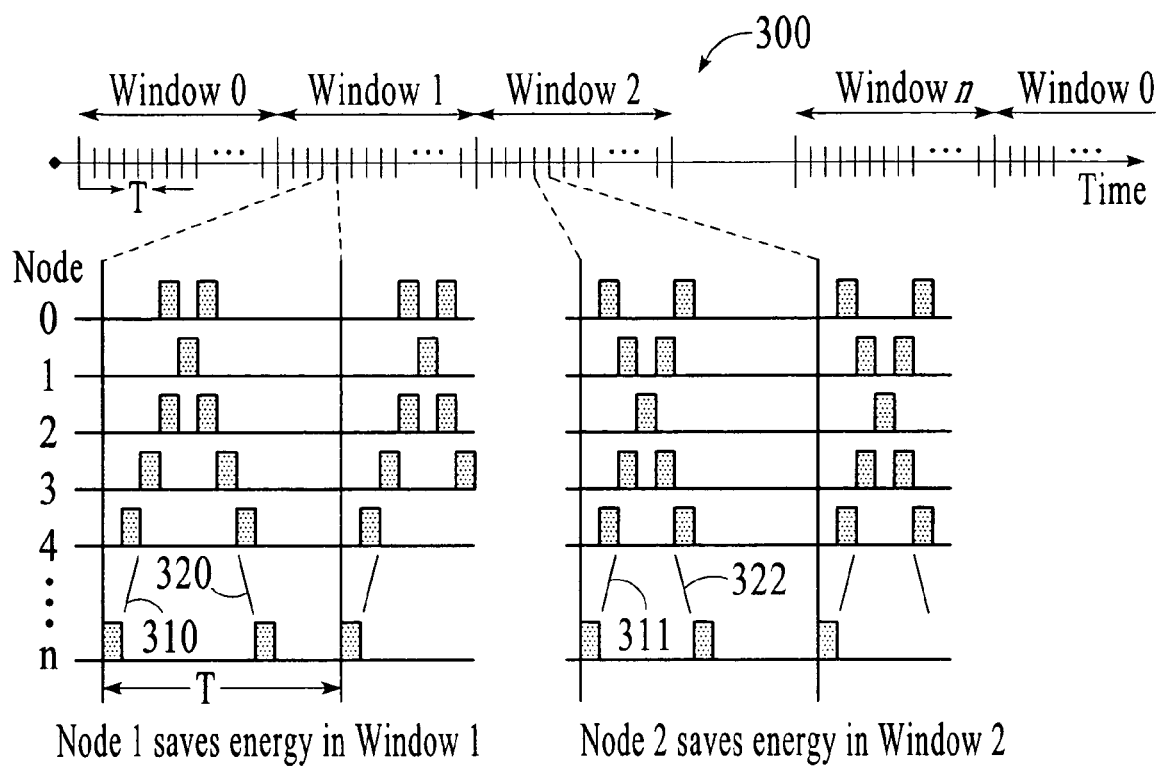
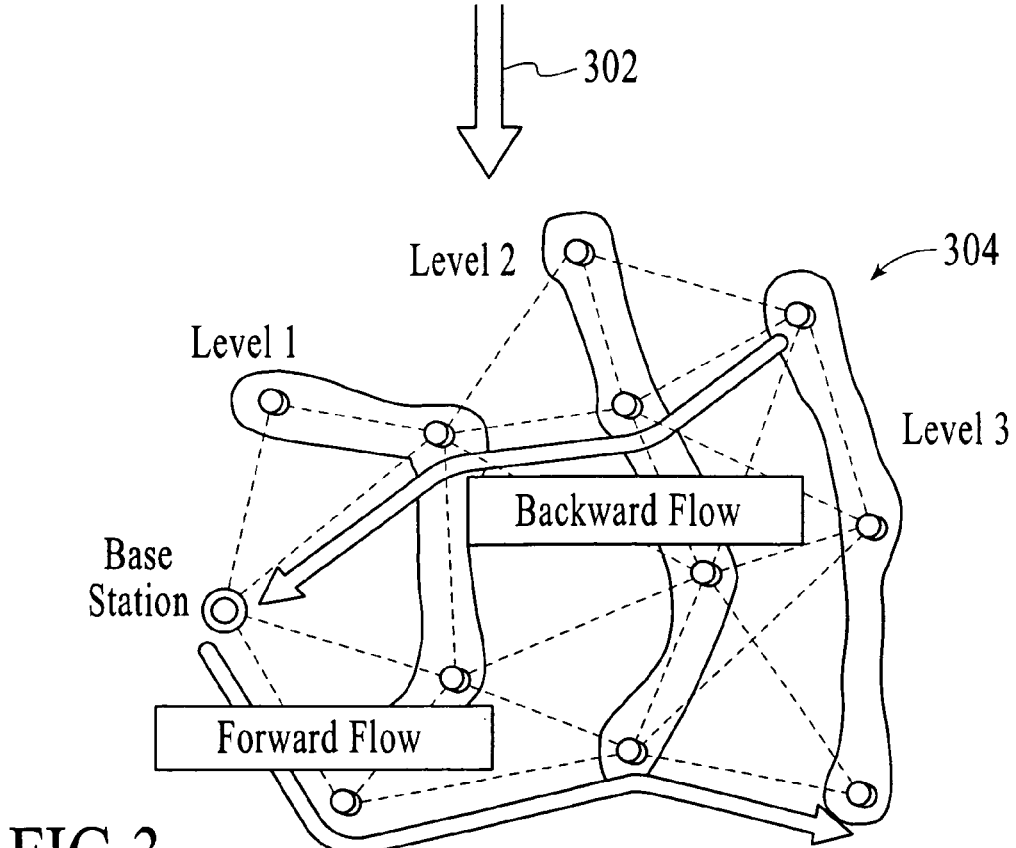
FIG.3

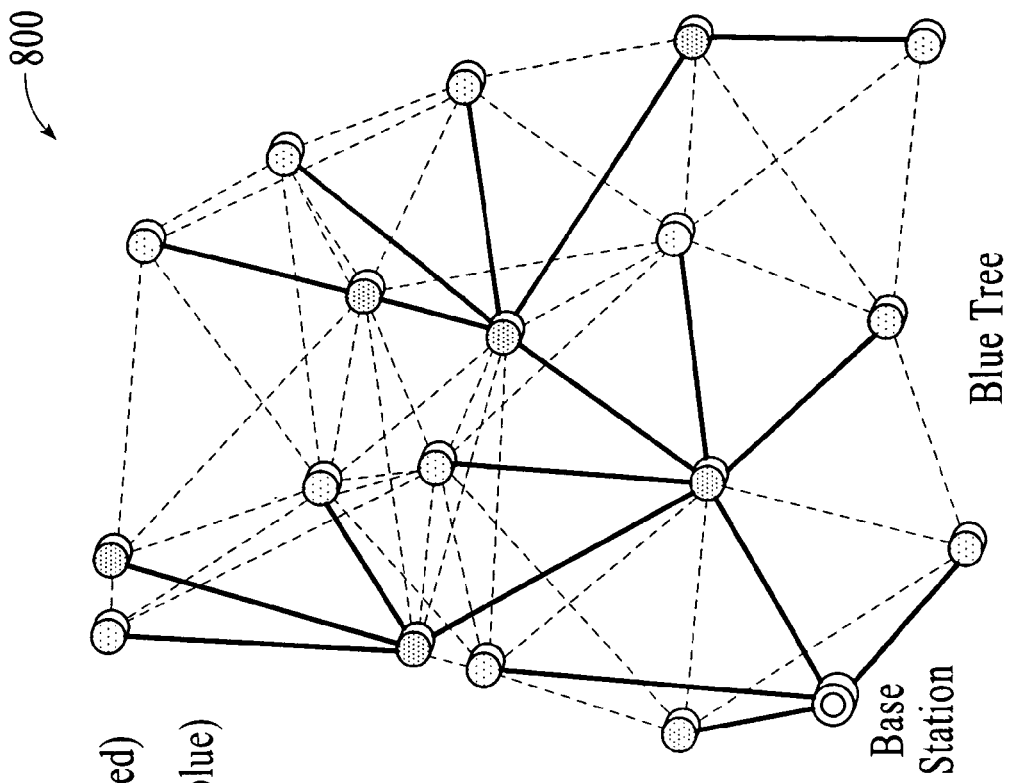
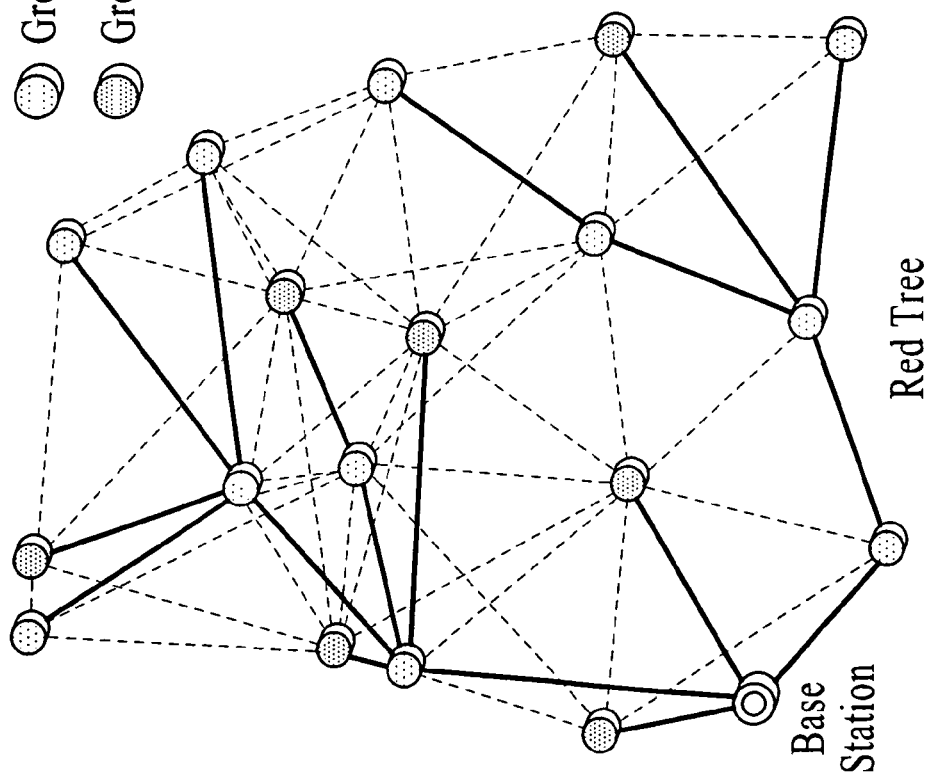
FIG.8

| | | | | | |
|---|---|---|---|---|---|
| 901 — Average Number of Neighbors | 7.4 | 11.3 | 13.7 | 15.2 | 17.6 |
| 902 — Average Number of Parents | 2.8 | 3.8 | 4.5 | 4.8 | 5.6 |
| 903 — First Approximation | N/A | 86.8% | 86.0% | 84.7% | 77.1% |
| 904 — Adaptive Weighting | N/A | 7.53% | 7.43% | 5.73% | 4.93% |
| 905 — Soft Sign Function | N/A | 0.60% | 0.47% | 0.23% | 0.07% |
| 906 — Layer Re-assignment | 0.13% | 0% | 0% | 0% | 0% |

FIG.9

NODE CONTROL IN WIRELESS SENSOR NETWORKS

TECHNICAL FIELD

The disclosure herein relates generally to wireless sensor networks and, more particularly, to control of nodes in wireless sensor networks.

BACKGROUND

A wireless sensor network may in general be defined as a distributed system consisting of many sensor nodes each equipped with a wireless radio transceiver along with application-specific sensors and signal processing hardware. Due to the typically short range of low-power RF transceivers, communication between nodes takes place via multi-hop through neighboring nodes.

The resources that can be put on a node are generally limited by the size and cost constraints, and the requirements such as flexibility and ease of installation. Therefore the nodes are typically resource-constrained while the network throughout its required lifetime should operate reliably. Therefore, energy-efficiency and guaranteed low delays are two primary goals in the design of a sensor network protocol.

Many prior studies have indicated that idle listening is a major source of energy waste in network nodes (see one or more of: Wei Ye, John Heidmann, and Deborah Estrin, "An Energy Efficient MAC Protocol for Wireless Sensor Networks," IEEE Infocom 2002; Wei Ye, John Heidmann, and Deborah Estrin, "Medium Access Control with Coordinated Adaptive Sleeping for Wireless Sensor Networks," ACM/IEEE Transaction on Networking, Vol. 12, No. 3, pp. 493-506, June 2004; Tijs van Dam and Koen Langendoen, "An Adaptive Energy-efficient MAC Protocol for Wireless Sensor Networks," Proceedings of the $1^{st}$ International Conference on Embedded Networked Sensor Systems (SenSys '03), 2003, pp. 171-180; and Gang Lu, Bhaskar Krishnamachari and Cauligi Raghavendra, "An Adaptive Energy-Efficient and Low-Latency MAC for Data Gathering in Wireless Sensor Networks," IEEE Proceedings of the $18^{th}$ International Parallel and Distributed Processing Symposium (IPDPS04)). For many radio chips, the energy used for idle listening is almost comparable with energy used for reception or transmission. Therefore to increase the lifetime, it is desirable to put the nodes in low power or sleep mode when there is no activity in the network.

Significant energy savings can be realized by putting the nodes into sleep mode and periodically awakening them and checking the channel for any signal (sniffing the channel). However, this can also increase the message delivery latency because for example information of a measurement by a sensor or a detected event can only be sent when the receiving node is active. Also, delivery latency can be increased when the message passes through multiple hops, an intermediate node needs to wait for the node in the next hop to wake up.

Researchers in ad hoc and sensor networks continue to search for new wakeup techniques to save power without suffering the large latency penalties associated with the wakeup process. Current methods can be divided into two main categories: scheduled wakeups, and wakeup on-demand (out of band wakeup).

Using scheduled wakeups, the nodes follow deterministic (or possibly random) wakeup patterns. Time synchronization among the nodes in the network is generally assumed. However, asynchronous wakeup mechanisms which do not require synchronization among the different nodes are also categorized in this class. Although asynchronous methods are simpler to implement, they are not as efficient as synchronous schemes, and in the worst case the delay can be very long.

When using wakeup on-demand methods, it is assumed that the nodes can be signaled and awakened at any point of time. This is generally accomplished by having two wireless interfaces or radios. A first radio is used for data communication and is triggered by the second ultra low-power radio which is used only for paging and signaling. Although these methods can be optimal in terms of both delay and energy, the cost issues, currently limited available hardware options and stringent system requirements prohibit the design of such systems. Consequently, there is a need for scheduled wakeup methods under which wakeups of sensor nodes are scheduled efficiently such that urgent but rare messages can be transmitted with small guaranteed end-to-end delay through multiple hops in the network.

INCORPORATION BY REFERENCE

Each publication and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIG. 1 is a network of nodes under control of a crossed ladders wakeup pattern, under an embodiment.

FIG. 3 is a network of nodes under control of an adaptive crossed ladders wakeup pattern, under an embodiment.

FIG. 8 is network that is divided into two groups with two disjoint trees spanning all nodes in the network, under an embodiment.

FIG. 9 is a table that includes the performance of the different phases of the coloring algorithm, under an embodiment.

Figure 2:
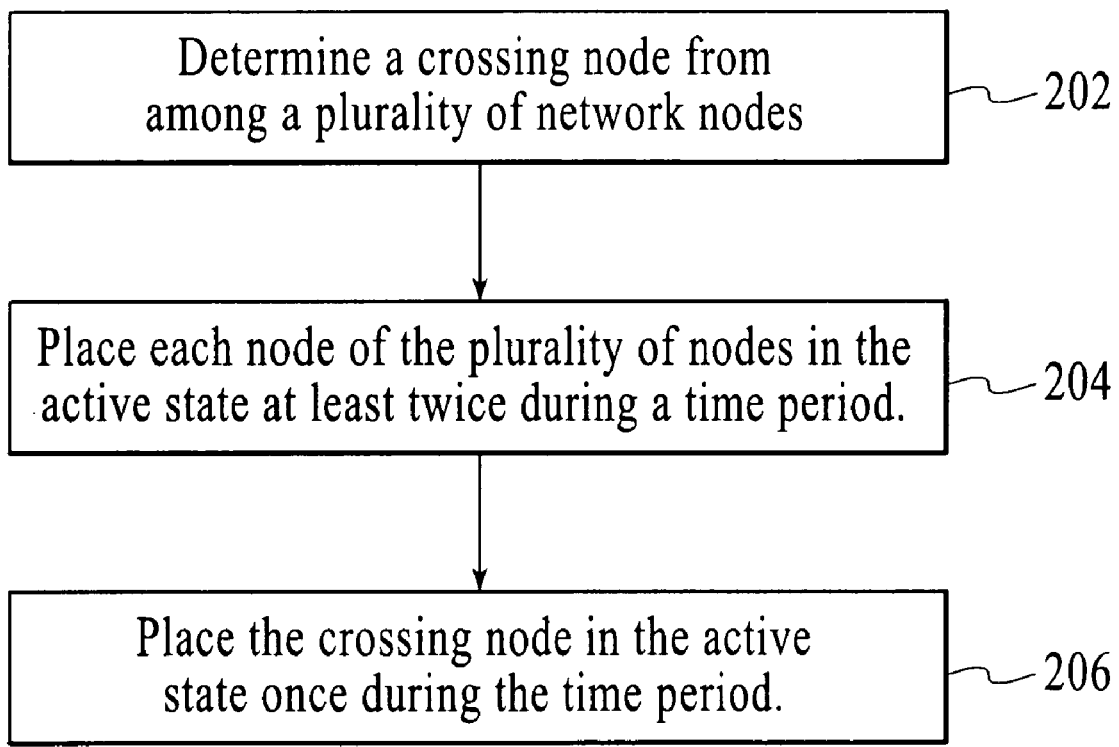
FIG. 2 is a flow diagram for node control using the crossed ladders wakeup pattern, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

Network node control is described below that includes node wakeup scheduling. The node wakeup scheduling of an embodiment reduces the energy consumption of levels of nodes and reduces the delay of information transfer through the network. The node wakeup scheduling of an embodiment includes a crossed ladder pattern that reduces the energy consumption of levels of nodes in the network by combining two wakeups in one level. The node wakeup scheduling of an alternative embodiment includes an adaptive version of the crossed ladder pattern that changes the wakeup patterns of the crossed ladder over time to provide uniform energy savings over all nodes of a network.

The network node control of an embodiment described below also includes the use of multiple trees to forward or transfer information through a network. This network control, referred to herein as "multi-parent node assignment," assigns multiple parents with different wakeup schedules to each node in the network. This multi-parent assignment reduces the delay in transmission of information through the network and also increases energy efficiency in the nodes. The multi-parent node assignment of an embodiment includes the process of parent assignment as a graph coloring problem and is Non-deterministic Polynomial time-complete (NP-complete).

In the following description, numerous specific details are introduced to provide a thorough understanding of, and enabling description for, embodiments of the network node control. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 is a network of nodes 104 under control 102 of a crossed ladders wakeup pattern 100, under an embodiment. The crossed ladders pattern 100 combines two ladders 110 120 such that the nodes in one of the network levels 130 (referred to herein as a crossing level nodes) wake up only once per period (T). The period T has a pre-specified duration as appropriate to a configuration of the network 104. In this way the crossing level nodes 130 will save more energy than others. The crossed ladders pattern 100 of this example causes nodes in level 2 130 to wake up once per period while the other nodes (Nodes in levels 0, 1, 3, 4, . . . N) of the network wake up twice per period.

FIG. 2 is a flow diagram for node control 200 using the crossed ladders wakeup pattern, under an embodiment. The node control 200 sequentially controls a state of the network nodes by controlling the nodes into an active state from an inactive state. The nodes of the network include for example a plurality of nodes from which a crossing node is determined 202, as described with reference to FIG. 1 for example. Sequentially controlling the nodes includes placing 204 each node of the plurality of nodes in the active state at least twice during a time period. The sequential control further includes placing 206 the crossing node in the active state once during the time period. Therefore, the sequential node control of an embodiment includes staggering initiation of the active state for the nodes.

Figure 4:
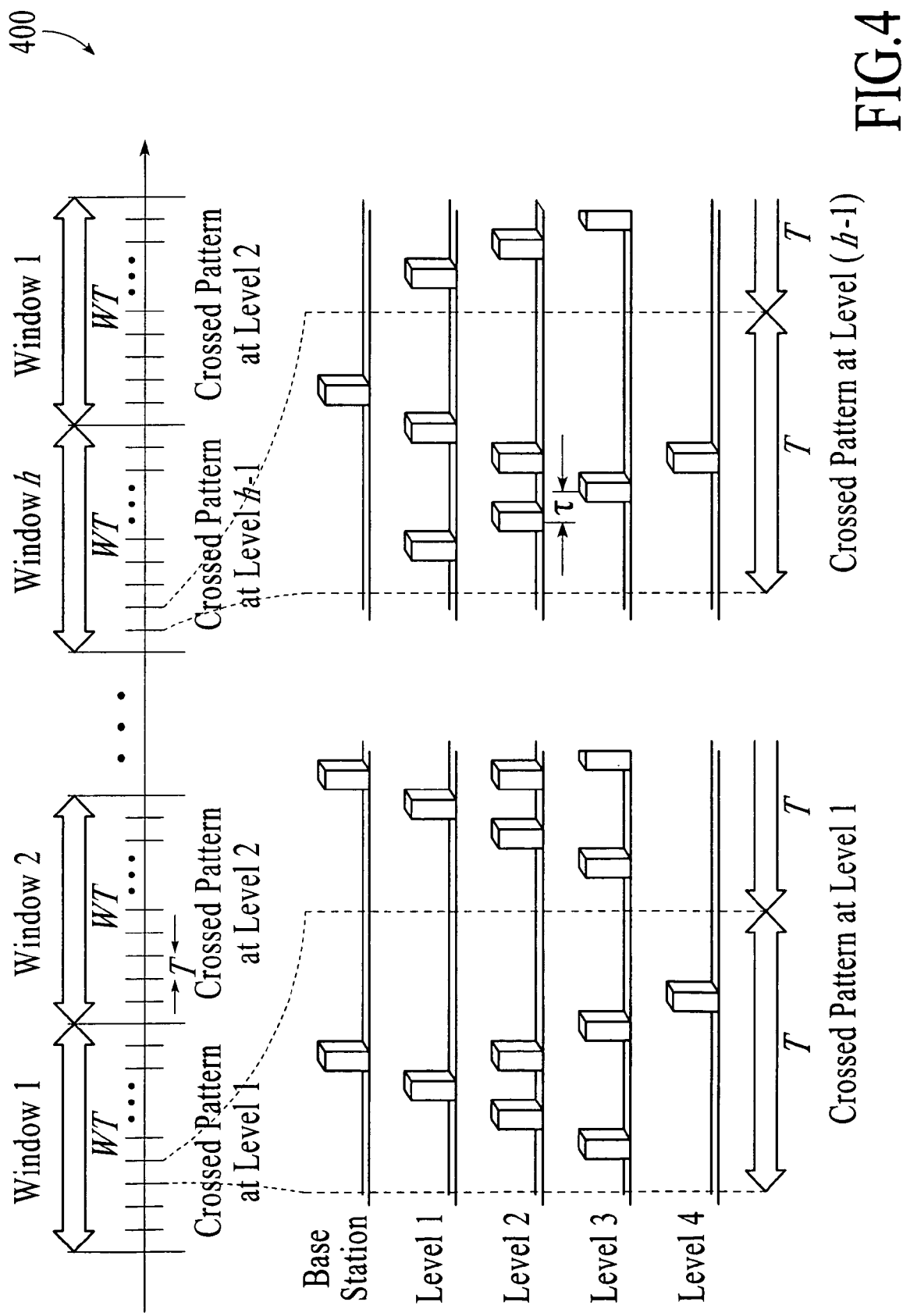
FIG. 4 is an adaptive crossed ladders wakeup pattern, under an alternative embodiment.

A crossed ladders wakeup pattern of an alternative embodiment, referred to herein as an "adaptive crossed ladders pattern," controls or adjusts the cross point of the two ladders in the pattern such that the saving applies to any other node in order to distribute the energy savings realized in the network among all or some pre-specified group or set of nodes. FIG. 3 is a network of nodes 304 under control 302 of an adaptive crossed ladders wakeup pattern 300, under an embodiment. FIG. 4 is an adaptive crossed ladders wakeup pattern 400, under an alternative embodiment.

Referring to FIG. 3, distribution of the energy savings among the nodes of the network results from use of a periodic change in the patterns used in the system over time such that all the nodes in the network get a chance to save energy over some period of time. The adaptive crossed ladders pattern generally divides time into different windows (e.g., Window 0, Window 1, etc.), each containing many slots of size T (period of one pattern). Different patterns are used within different windows so that a different node serves as the crossing node during each window (e.g., Node 1 is the crossing node in Window 1; Node 2 is the crossing node in Window 2).

As described above with reference to FIG. 1, the adaptive crossed ladders pattern 300 of Window 1 combines two ladders 310 320 such that the crossing node wakes up only once per period (T). The crossed ladders pattern 300 of this example causes Node 1 to wake up once per period while the other nodes (Nodes 0, 2, 3, 4, . . . N) of the network wake up twice per period during Window 1. Similarly, the adaptive crossed ladders pattern 300 of Window 2 combines two ladders 311 322 such that the crossing node wakes up only once per period (T). The crossed ladders pattern 300 of this example causes Node 2 to wake up once per period while the other nodes (Nodes 0, 1, 3, 4, . . . N) of the network wake up twice per period during Window 2.

The adaptive crossed ladders pattern of alternative embodiments can use different patterns for different durations (different window lengths) to change the amount of energy savings realized for different nodes in the system. Therefore, the wakeup patterns can be adaptively changed based on the amount of energy remaining in nodes such that the network lifetime is maximized.

Each node or some portion of nodes of a network can be controlled using the node control techniques described here. Embodiments may control the nodes using a central processor-based controller that includes the node control described herein. Other embodiments may control the nodes using multiple processor-based controllers that each include the node control described herein. Additional embodiments may include a control algorithm in one or more network nodes, the control algorithm controlling the state of individual nodes in accordance with the node control described herein.

The network assumed in the node control systems and methods described herein include regular nodes and a base station. The base station can be less energy constrained and more computationally powerful than regular nodes, but it does not necessarily have more communication capabilities. The messages in the network are sent through multiple hops, and each message has an originator (source) and a final destination (sink). Two types of message are possible including forward direction (downlink) messages and backward direction (uplink) messages. Forward direction messages are those messages in which a base station sends a message to one or more nodes in the network. Backward direction messages are those messages in which a regular node sends a message to a base station.

Although the nodes can help one another by forwarding and relaying the messages, in the model described herein there is no traffic flow among the regular nodes. In other words, there is no message where both the source and the sink are regular nodes and one of the two has to be the base station.

This traffic pattern can be used to model many different applications. The backward (node to the base station) direction represents the transfer of sensor measurements or sensed events (alarms) by the node, and the forward (base station to node) messages correspond to the query or command messages issued by the user through the base station.

Messages in the network are rare, however they are urgent. The messages are typically event-triggered and therefore their occurrence time is not generally synchronized with the wakeup pattern of the network. It is assumed that a message can arrive at any time to any node in the network, e.g., a node can sense an event which should be reported to the base station, or the user can send a query command at any time through the base station to any node in the network.

The delay of a message is defined as the time duration between when the message arrives at its source node until the time it reaches its final destination. Delays include for example the worst-case delay, the average delay and generally the distribution of the delay. Delay seen by any message can be divided into two segments that include the detection delay, and the transmission delay. Detection delay is the interval from when the message arrives to the source node till the time it is first sent to another node in the network. Transmission delay is the remaining time till the message reaches its final destination (the aforementioned definition of detection delay may be slightly different from the detection delay used by others as typically the detection delay is defined as the time an event occurs till the time it is detected by one of the nodes in the network; in the models described herein however, the detection delay represents the time from the occurrence of the event till the time it is being sent in the network for the first time). Both the detection and communication delays are considered in the analysis herein but the main focus is on arranging the radio wakeup times such that the overall worst-case delay is minimized.

The nodes in the network regularly wake up. During each wakeup, a node listens for a short period of time, and checks the channel for any activity. This process is referred to as "sniffing the channel". If the received signal level is above a pre-specified threshold, the node goes to the full receive mode and continues listening to receive the message; otherwise, it goes back to low power mode. Since the messages in the network are rare, in almost all the wakeups, the nodes are in active mode only for a short period of time and they immediately go back to sleep mode. The selection of the length of the sniffing period and the signal level threshold are very crucial in the performance of the system. They mainly depend on the hardware and have to be selected such that the node does not miss any message. The length of the active period per wakeup is limited by different factors such as the warm-up time of the radio, and the minimum time required to detect a signal in the channel.

Generally the energy consumed per wakeup is small, but since the wakeup process is performed very frequently, the energy consumption of wakeup process forms a major part of the overall power consumption of the network. Therefore designing an energy-efficient wakeup method is essential for achieving a long lifetime for the network. To get a feeling of how important the wakeup power consumption can become, consider the following example: according to the data sheet of Chipcon CC1100 radio (16), if the nodes wake up once every second the average current consumption is 15 µA, which is negligible in comparison with average current draw for reception or transmission at data rate 250 Kbps which is about 15 mA, thousands times more. However, in a day of operation of the network, the energy consumed by a node just due to the wakeup would be approximately $$15\ \mu A \times 3V \times 86400\ s = 3.9\ J,$$

which is equivalent to transmission/reception of approximately 21 Mbits of information. In many applications, the overall traffic that passes through a node in a day is generally much less than 21 Mbits.

The description herein also assumes that the nodes in the network are synchronized. The connectivity graph of the network represents the communication links and shows which nodes can communicate or interfere with one another (in stationary networks it is useful to find the entire connectivity graph of the network during initialization; there are many different methods that can efficiently discover the connectivity graph of the network. The nodes in the network are assumed to be stationary so that the connectivity graph and the neighbors of each node do not change over time. It is assumed that some information about the connectivity graph of the network is available, namely that each node in the network should know its level. Referring to FIG. 1, the base station is the only level 0 node. All nodes that can talk directly to the base station are level 1, and any node which has a link to a level 1 node is defined as a level 2 node, and in the same way the levels are defined. All nodes that are in the same level then use the same wakeup pattern. Therefore, from the perspective of the wakeup scheme all level 1 nodes are combined into a super node 1, all level 2 nodes into super node 2, etc. In this way the tree topology of the host network is reduced into a straight line topology.

Regarding variables and notation used herein, there are "N" nodes in a network and $L_k$ represents the set of nodes in level "k" that are exactly k hops away from the base station. The variable "h" represents the maximum number of hops, or alternatively the maximum number of levels.

The delay seen by messages going in forward direction or backward direction can generally be different. The delays are random and depend on the level of the receiving or transmitting node and the time the message arrives to the network. The variables $D_F$ and $D_B$ represent the random variables representing the delay seen by a node in the last level in forward or backward directions, respectively (i.e., $D_F$ shows the delay seen by a message sent from the base station to a node in the last level (a node in $L_h$), and $D_B$ shows the delay of a message from a node in $L_h$ to the base station). Nodes in lower levels may have better delays. The notation $X \sim U[\alpha, \beta]$ is used to show that X is a continuous random variable with uniform distribution over the range of $[\alpha, \beta]$.

The amount of energy consumed by a node for each wakeup is assumed to be constant and denoted by $E_o$. The variable $T_{eff}$ represents the average effective wakeup period of a node, i.e., on average a node wakes up once every $T_{eff}$ seconds. The wakeup rate of a node $R_{eff}$ is approximately $1/T_{eff}$, and the power consumption due to wakeup is then given by $$P_{wakeup} = E_o/T_{eff} = R_{eff} E_o.$$

In order to formulate the tradeoff between the power consumption and latency for different wakeup schemes, we derive both forward and backward delays (their maximum, minimum, average and generally distribution) in terms of the effective wakeup period $T_{eff}$.

The crossed ladders wakeup pattern reduces the energy consumption of the nodes, compared to a two-ladders pattern for example, by combining two wakeups in one of the levels of nodes as described above with reference to FIG. 3 and FIG. 4. This pattern therefore saves energy for the nodes in one of the levels, and the nodes in other levels of the network hierarchy continue to wake up twice in every period T. The crossed ladders pattern therefore provides $T_{eff} = T/2$.

To create a uniform energy savings over all nodes in different levels, the adaptive crossed ladders pattern as described above changes the wakeup patterns over time. For a pre-specified period of time (e.g., a window of approximately WT) a wakeup pattern is used in which two ladders cross at a first level. Then at some pre-specified time the network switches to a different wakeup pattern in which the two ladders cross at a level different from the first level (e.g., a second level). Further more, the adaptive pattern continues so that at another pre-specified time the network switches to a different wakeup pattern in which the two ladders cross at a level different from the first level and the second level (e.g., a third level). The adaptive pattern may continue until such time as the two ladders have crossed at each level of the network and then repeat the preceding pattern or switch to another version of the crossing pattern. For example, after a total number of patterns of approximately (h−1) patterns, which consumes a total time of approximately [(h−1)WT], the network reverts back to the first pattern and the adaptive ladder process repeats. In this way, the energy savings are distributed over different levels in the network.

The average power consumption of the wakeup method under the adaptive crossed ladder method depends on the average wakeup rate (or average wakeup period). Over a full cycle of [(h−1)WT] seconds, the nodes in intermediate levels wake up twice every T seconds in (h−2) windows, and once in every T seconds in one window.

Therefore, the average wakeup period is $$T_{\mathit{eff}} = ((h-1)WT)/(2W(h-2)+W) = ((h-1)T)/(2h-3).$$

For this scheme the forward and backward delays will be the same as in a two-ladders pattern, but the term $((2h-3)/(h-1))T_{\mathit{eff}}$ is used instead of $2T_{\mathit{eff}}$, so, $$D_F, D_B \sim U[(h-1)\tau, ((2h-3)/(h-1))T_{\mathit{eff}} + (h-1)\tau],$$

$$\max(D_F) = ((2h-3)/(h-1))T_{\mathit{eff}} + (h-1)\tau, \text{ and}$$

$$E(D_F) = ((2h-3)/(2h-2))T_{\mathit{eff}} + (h-1)\tau.$$

This adaptive crossed ladder pattern is the most energy-efficient pattern when compared to, for example, fully synchronized wakeups, even and odd patterns with offset, ladder patterns, and two-ladders patterns, but is not so limited. The adaptive crossed ladder pattern is particularly effective with networks having small values of h. As the term h goes to larger values, the realized energy savings may be comparatively reduced.

In comparing the crossed ladders pattern to the fully synchronized wakeup, for example, all network nodes in the fully synchronized wakeup are controlled to wakeup at the same time according to a simple periodic pattern having period $T_{\mathit{eff}} = T$. This example assumes a message path in which a message arrives at the base station and is forwarded to a node in the last level. The worst case delay in the network is hT. The delay in both forward and backward directions is the same and has the distribution, $$D_F, D_B \sim U[(h-1)T_{\mathit{eff}}, hT_{\mathit{eff}}],$$

$$E(DF) = (h - \tfrac{1}{2})T_{\mathit{eff}}.$$

The randomness in delay is due to the randomness in the arrival time of a message. It is assumed that if there is any arrival within a period of T, the arrival time is uniformly distributed over this period.

In comparing the crossed ladders pattern to even and odd patterns with offset, for example, the even and odd patters with offset controls nodes in odd levels (e.g., L1, L3, etc.) using a periodic pattern with period $T_{\mathit{eff}} = T$, and controls nodes in even levels (e.g., L0, L2, etc.) using the same periodic pattern with an offset of T/2.

A message is delivered with maximum latency if it arrives after the last wakeup of the receiving node. In this case, the first hop requires T seconds, and the following (h−1) hops each takes T/2 seconds, thus the worst case delay is (h+1)T/2. Due to the symmetry of the pattern the forward and backward delays are again the same and have the following distribution:

$$D_F, D_B \sim U[((h-1)/2)T_{\mathit{eff}}, ((h+1)/2)T_{\mathit{eff}}],$$

$$E(D_F) = (h/2)T_{\mathit{eff}}.$$

In comparing the crossed ladders pattern to the ladder pattern, for example, the ladders pattern controls the nodes in different levels to follow a periodic pattern with period $T_{\mathit{eff}} = T$, but the wakeup patterns are staggered. There is a small time difference between the wakeup times of nodes in two succeeding levels, and this time difference has been compared to the practice of synchronizing traffic lights to turn green (wake up) just in time for the arrival of vehicles (packets) from the previous intersections (hops). The ladder pattern has been referred to under different names such as staggered wakeup, streamlined wakeup, and fast path algorithm.

The time difference between the wakeup times of two nodes in adjacent levels under the ladder pattern is denoted by τ. By decreasing this value, the forwarding time of the message can be minimized. However, an intermediate node should fully receive the message before it can forward it to the next level, so the value of τ is limited by the size of the message and the time required to transmit the message.

In forward direction the first hop requires at most T seconds in case the message arrives at the base station after the wakeup time of level 1 nodes, and then the next (h−1) hops each require only a short period of length τ. Therefore the forward delay is represented by the following, $$D_F \sim U[(h-1)\tau, T_{\mathit{eff}} + (h-1)\tau],$$

$$E(D_F) = T/2 + (h-1)\tau.$$

In the backward direction, the first hop again requires at most T seconds, and the next hops each require (T−τ) seconds. The wakeup time of the base station does not affect the forward delay (the same is true for backward delay and the pattern of the last level nodes) but it is important for the backward delay. Therefore, to optimize the backward delay, the best option is to have the base station wake up right after the first level nodes. In this way, the last hop in the backward direction would only take T seconds instead of (T−τ). The distribution of the backward delay is given as, $$D_B \sim U[(h-2)(T_{\mathit{eff}} - \tau) + \tau, (h-1)T_{\mathit{eff}} - (h-3)\tau],$$

$$E(D_B) = (h - \tfrac{3}{2})T_{\mathit{eff}} - (h-3)\tau.$$

Depending on the direction of the ladder pattern, either the forward or backward delay can be significantly reduced, but the delay in the other direction remains almost as high as the fully synchronized pattern.

In comparing the crossed ladders pattern to the two-ladders pattern, for example, the two-ladders pattern provides a pattern that guarantees good delay in both directions. The two-ladders pattern combines two differently oriented ladders, one in the forward direction helping to swiftly send messages from base station to the nodes, and another in the backward direction for the reverse path. The nodes in intermediate levels no longer follow a simple one-wakeup-per-period T pattern, and the pattern is slightly more complex though still easy enough for implementation. Each node in the middle level wakeup twice every T seconds, so on average the effective wakeup period is $T_{\mathit{eff}} = T/2$. Because of the symmetry of the pattern, the delays in two directions are the same, $$D_F, D_B \sim U[(h-1)\tau, 2T_{\mathit{eff}}+(h-1)\tau],$$

$$\max(D_F) = 2T_{\mathit{eff}}+(h-1)\tau,$$

$$E(D_F) = T_{\mathit{eff}}+(h-1)\tau.$$

This two-ladders pattern is more energy-efficient than the fully synchronized wakeup, even and odd patterns with offset, and the ladder pattern, mainly due to multiple wakeups in each period and its structured pattern. However, the two-ladders pattern is not as energy-efficient as the crossed ladders or adaptive cross ladders described herein.

In addition to the crossed ladders and adaptive crossed ladders described above, the network node control of an embodiment includes multi-parent node assignment. The multi-parent assignment assigns multiple parents with different wakeup schedules to each node in the network in a way that not only reduces the delay but results in increased energy efficiency in the nodes. The multi-parent assignment of an embodiment uses a level concept in which all nodes that are one hop away from the base station are defined as level one nodes, and all nodes that are two hops away from the base station are defined as level two nodes, and so on.

The tree topology is the main structure employed for data collection and forwarding in sensor networks. In a tree topology each node has a single path to the base station, where a parent node is assigned to each node. However, multiple paths are usually available especially when the connectivity graph of the network is dense.

The network node control of an embodiment includes a multi-parent wakeup that takes advantage of the existence of multiple paths in the network to reduce the backward latency while keeping the number of wakeups fixed. The multi-parent wakeup generally uses a combination of graph coloring techniques along with finding the optimum wakeup patterns in a way that assigns multiple parents with different wakeup schedules to each node in the network, instead of a assigning a single parent to each node. Thus, the multi-parent wakeup uses multiple trees for data forwarding instead of using a tree structure.

The multi-parent assignment of an embodiment and the description below assumes two parents are assigned to each node, but the embodiment is not so limited and can be generalized to work with any number of parents. The multi-parent assignment is divided into graph coloring and wakeup pattern components but is not so limited. Using graph coloring, the nodes of the network are divided into two groups, red nodes and blue nodes, such that any node gets at least one red parent and one blue parent; this is performed using heuristic algorithms for example.

When the nodes can not be colored so that the above condition is satisfied, an embodiment uses purple nodes. For example if a node has only one link to the rest of the network, then clearly it cannot have two parents. In this case, the parent of the node is colored purple. Purple nodes have the functionality of both red and blue nodes. An embodiment minimizes the number of purple nodes in the network, as they will consume more energy than the red and blue nodes in the network.

Following the coloring of the nodes, two parents are selected for each node, one red parent (mother) and one blue parent (father), under an embodiment. The base station is assumed to be purple. Therefore, each node in the network has one blue path (includes only blue nodes) and one red path (includes only red nodes). There remain many other paths that use both the red and blue parents.

The multi-parent assignment divides time into frames where red nodes and blue nodes are active alternately (e.g., red nodes are active during the odd frames, and blue nodes are active during the even frames). Purple nodes are active during both red and blue frames. The multi-parent assignment of an embodiment creates within each frame forward ladder wakeup patterns similar to the ladder pattern described above, but the embodiment is not limited to the forward ladder wakeup pattern.

Figure 5:
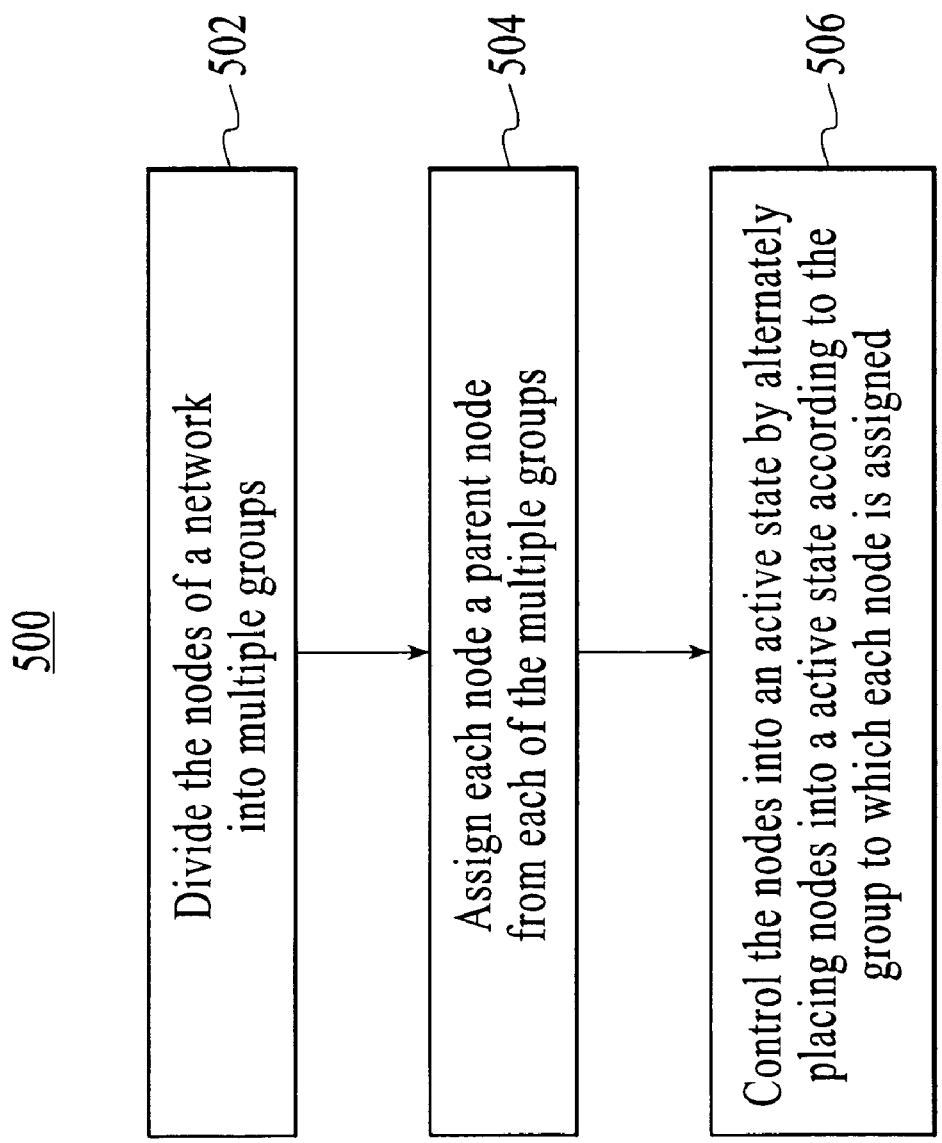
FIG. 5 is a flow diagram for node control using the multi-parent assignment, under an embodiment.

FIG. 5 is a flow diagram for node control 500 using the multi-parent assignment, under an embodiment. The multi-parent assignment divides 502 the nodes of a network into multiple groups. Each node is assigned 504 a parent node from each of the multiple groups. The parent node of an embodiment watches over the node to which it is assigned. The nodes of the network are controlled 506 into an active state by alternately placing nodes into an active state according to the group to which each node is assigned.

Figure 6:
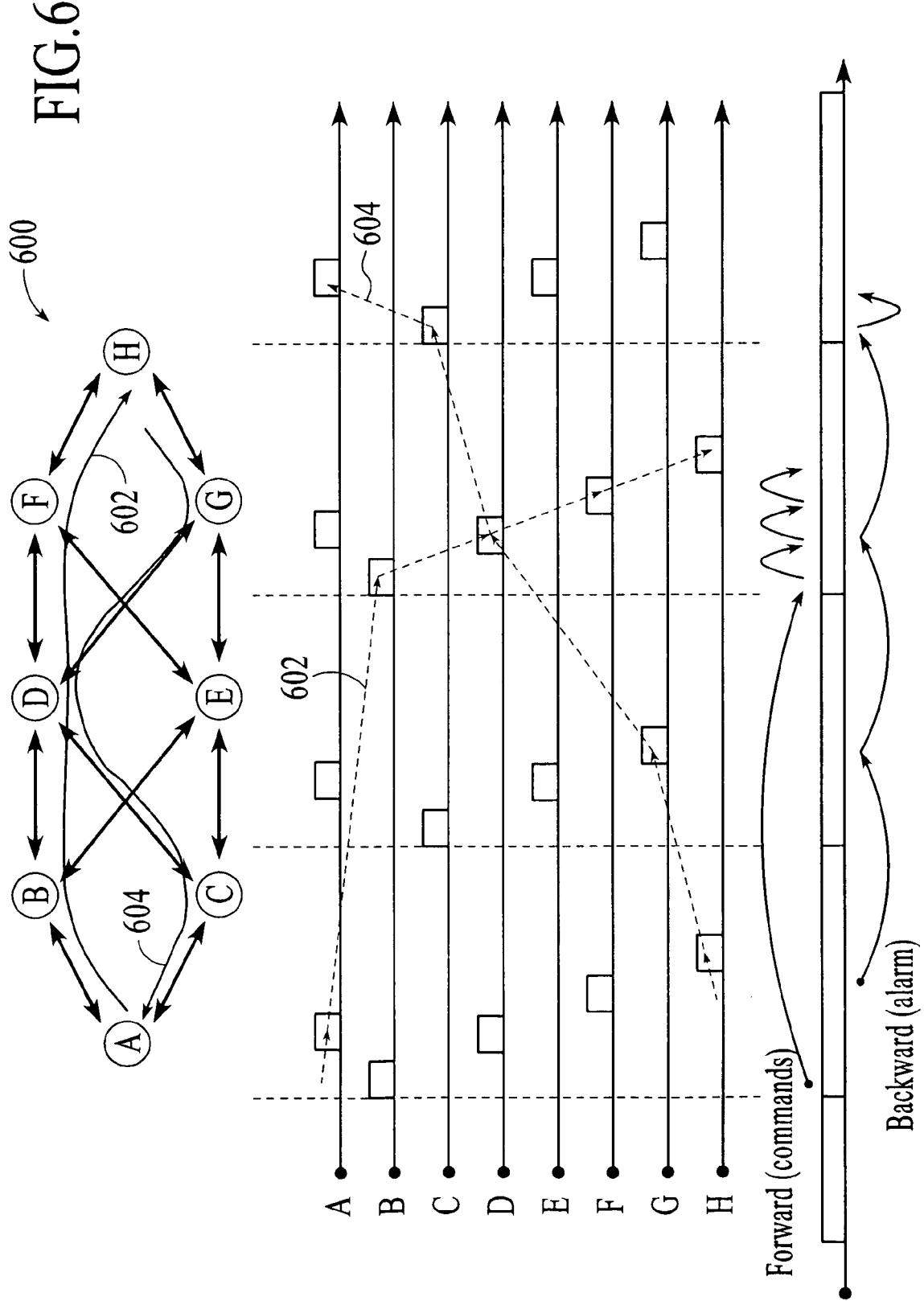
FIG. 6 shows an example of message forwarding through a network using the multi-parent assignment, under an embodiment.

FIG. 6 shows example messaging forwarding through a network 600 using the multi-parent assignment, under an embodiment. The network includes Nodes A, B, C, D, E, F, G, and H. Nodes B, D, F, and H are color blue in this example but are not so limited. Nodes C, E, and G are color red in this example but are not so limited. Node A is a base station in this example, but is not so limited.

In the forward direction (when the base station wants to talk to one of the nodes in the network) 602, if the terminal node (destination node for a transferred message) (Node H) has color blue as in example 600, then the blue path (Node B, D, and F) is used to transfer information (e.g., send packets) to the terminal node. Similarly, if the terminal node has color red, then the red path (Node C, E, and G) is used to transfer information to the terminal node. Since the wakeup patterns are formed like ladders, the forward direction will be relatively fast and the maximum forward delay seen by a node is approximately equal to one wakeup period (of blue or red nodes).

In the backward direction (when the node wants to send a message to the base station) 604, the node having a message to transfer selects the parent that will wake up sooner, and sends the message to the selected parent node; the message can come at any time. The node receiving the message in turn selects its parent that will wake up sooner, and sends the message to its selected parent node. This process continues until the message reaches the base station.

Following is an example of message forwarding in the backward direction. When a node having a message is four (4) hops away from the base station (Node A), and the message comes at the beginning of a red frame, then the node (Node H) transfers the message to its red parent (Node G) during the red frame. The red parent (Node G) forwards the message using its blue parent (since it will wake up sooner) (Node D). The blue parent (Node D) forwards the message using its red parent (since it will wake up sooner) (Node C); the red parent (Node C) transfers the message to the base station (Node A). Therefore, unlike the forward direction where either the blue path or the red path is used, in backward direction the nodes use both the red and blue parents alternately to forward the message towards the base station.

Generally message transfer via the forward direction is fast because of the ladder structure. Additionally, message transfer via the backward direction is fast because multiple parents are available and used to send the message toward the base station. Every node wakes up only once per two frames and therefore sleep more under the multi-parent assignment of an embodiment.

The multi-parent assignment increases the wakeup energy-efficiency of nodes of a network by exploiting the existence of multiple paths in the network. Under this method, depending on when a message arrives at a node it can be forwarded through different nodes and paths in the network. The multi-parent assignment can be used in conjunction with any of a variety of wakeup patterns, for example those described herein.

As described above, the multi-parent assignment partitions or divides the nodes in the network into multiple groups such that at least one parent from each group can be assigned to any node in the network. For example, if there are two groups of red and blue nodes, any node in the network should have a red parent (mother) and a blue parent (father). The description below provides methods for finding such a partition (or equivalently coloring) for a given network by efficiently coloring the graph and finding a partition in the subsequent section. The process of parent assignment in a stationary network is a one-time operation which can be done during the initialization of the network, but is not so limited.

Assuming that the coloring is done and multiple parents have been identified or selected for each node in the network, significant power savings can be gained by having multiple parents wake up alternately. A node can be regarded as a child that uses a parent to watch over it periodically. When multiple parents are assigned to each node, they can share this responsibility among themselves and save energy by so sharing. For example, in the case of two groups of red and blue nodes, when the mother is awake the father does not need to wake up and can sleep and when the father wakes up, the mother can sleep. In this way, both parents sleep more often and wake up less frequently, but the child still sees one of the parents every time.

In typical wakeup patterns, the nodes in each level follow a periodic pattern with period T. One period T can include a frame and different groups of nodes can wake up periodically in different frames. For the two-group example the red and blue nodes wake up in alternate frames, e.g., red nodes wake up only in odd frames and blue nodes wake up only in even frames. Therefore, effectively each node wakes up half as frequently as before.

From the perspective of messages sent by a node nothing has changed under the multi-parent assignment (e.g., a node still has the opportunity to communicate and send a message as often as before, but instead of sending the message to only one node, there are multiple parents that the node can sent the message to, but this does not affect the delay seen by such messages). Therefore the same backward delay can be obtained while all nodes wake up much less frequently than when not using multi-parent assignment. Equivalently if the nodes wake up at the same rate as before (e.g., without multi-parent assignment), a better delay can be guaranteed. An additional advantage of using the multi-parent assignment described herein is the increased reliability inherent in forwarding messages in the network, because if one parent fails the message can still be transferred to its destination through the other parent nodes.

The base station of an embodiment wakes up in all frames so that it can receive messages at any time. Therefore, the base station belongs to all groups. In the example of two groups of red and blue nodes, the base station is therefore a purple node.

The variable "g" represents a number of groups. The multi-parent assignment can be used along with any of the wakeup patterns described herein. Use of multi-parent assignment reduces the effective wakeup period by a factor of g. Hence, to obtain the distribution of backward delay, "$T_{eff}$" in the expressions described above can be replaced with the quantity ($T_{eff}/g$).

It can be shown that the distribution of forward delay will be uniform over the same range of values (for ladder and two-ladder and crossed ladder patterns) or it is slightly improved (for synchronized and even-odd patterns).

Figure 7:
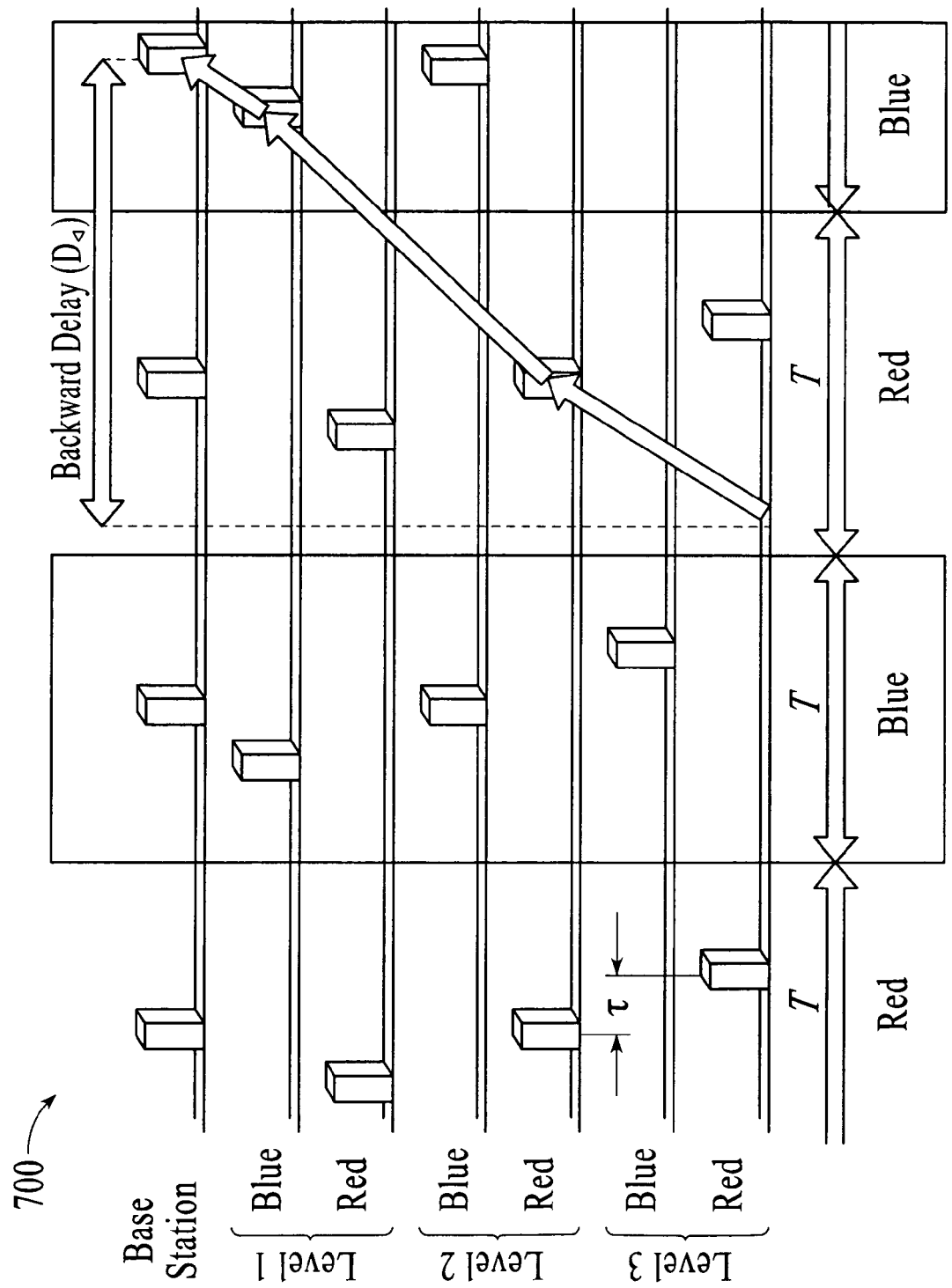
FIG. 7 is a network using multi-parent assignment with a forward ladder wakeup pattern, under an embodiment.

The use of multi-parent assignment improves the backward delay, and the forward delay either remains the same or is reduced. In order to balance these effects and get a good delay in both directions, an embodiment combines the forward ladder wakeup pattern, which initially has a good forward delay, with the multi-parent assignment which improves the backward delay. FIG. 7 is a network 700 using multi-parent assignment with a forward ladder wakeup pattern, under an embodiment. The coloring of this example includes "red" and "blue" but is not so limited. This example uses g=2. This combination of multi-parent assignment and forward ladder wakeup provides the most energy-efficient node control scheme while providing relatively small delays in both forward and backward message transfer directions.

The assignment of parents generally divides the nodes in the network into g groups (or colors the nodes with g different colors) such that every node has at least one parent from each group (or each color). Equivalently, assignment of parents can be formulated as finding g node-disjoint spanning trees with a fixed root in a given graph. FIG. 8 is network 800 that is divided into two groups with two disjoint trees spanning all nodes in the network, under an embodiment.

The multi-parent node assignment of an embodiment is NP-complete, even for the case of g=2. This is shown by reducing the 3SAT problem to an instance of a graph coloring problem. For larger values of g, unless the network is very dense, partitioning the nodes into groups and assigning parents may become computationally difficult. Therefore, g=2 is the most practical value which balances the initial complexity in assigning parents with the benefits gained from using the multi-parent idea. Described below is an efficient and fast heuristic algorithm to find a valid coloring for a given network with g=2. A centralized approach is used where the algorithm is executed on the base station or some other computationally powerful device which knows the connectivity graph of the network, but the embodiments are not so limited.

The multi-parent assignment of an embodiment includes a graph coloring algorithm. This algorithm colors the nodes in a given graph red or blue (or possibly purple) such that every node in the network gets at least one red parent and one blue parent, or instead a purple parent. Purple nodes have the functionality of both blue and red nodes. The base station is a purple node, but the number of other purple nodes in the network should be minimized. Purple nodes are used to solve some special cases where no valid coloring can be found. For example, if a node is connected to only one other node in the network, then it can not have two parents.

If the number of nodes in the network is small (e.g., N less than approximately 20), it may be possible to use a brute-force search over the entire space of possible colorings (which has $2^N$ points) and find a feasible solution. However, since the number of possible points grows exponentially with N, for larger networks this will be very time-consuming.

The heuristic graph coloring algorithm described herein includes different phases. Each phase adds some additional refinements and improvements to the previous phase at a possible cost of increasing the complexity and running time of the algorithm. The phases of an embodiment include, but are not limited to, layer assignment, first approximation, adaptive weighting, soft sign function and search, and layer reassignment. Each phase is described in detail below.

The first phase of the coloring algorithm assigns a layer to each node. A layer of a node is a tree-related parameter which shows the distance between the node and base station in terms of the number of hops (when there are multiple trees, the layer is defined as the largest distance over all trees). A layer and a level of a node are two different parameters. A level of a node is only related to the connectivity graph, but a layer is assigned by the coloring algorithm. A layer of a node should be larger or equal to its level. For example, a node in level 2 can become a node in layer 2 or layer 3. Initially, the coloring algorithm starts by setting the layer of each node the same as its level; subsequently, the fourth phase of the algorithm may move one or more of the nodes to a higher layer.

Upon completion of the layer assignment, a first approximation phase controls each node to find or identify the set of nodes in the lower layers to which it is coupled or connected. This set of nodes is referred to herein as the potential parents set and is represented by variable $P_n$ for node n. A variable $x_n$ is associated with each node in the network and has a value of +1 or −1 to indicate the color of the node (e.g., $x_n$=+1, node n is blue; $x_n$=−1, node n is red).

Instead of trying to satisfy the condition that each node gets at least one red parent and one blue parent, the first approximation of an embodiment attempts to balance the number of red and blue parents of each node. Variable $z_n$ is defined for each node as a measure of this balance, where $z_n$ is approximately equal to a summation of $x_k$ across the set where k is a member of $P_n$.

If node n has almost the same number of blue and red parents, then $z_n$ will be close to zero. The following optimization is solved to minimize the weighted squared sum of variables $z_n$ over all nodes as, $$\text{summation across n of } (w_n z_n^2) = x^T P^T W P x,$$

subject to $(x_n)^2=1$, and where $w_n$ is the weight associated with node n. Vector $(x=(x_1 \ldots, x_N)T)$ is the optimization variable, and the matrix $P=[p_{ij}]$ is defined such that, $$p_{ij}=1 \text{ if j is a member of } P_i,$$

otherwise $p_{ij}=0$, and the matrix W has elements $w_n$ on its main diagonal and zero in all other positions.

The problem is now reduced to a two-way partitioning problem (eg, see S. Boyd and L. Vandenberghe, "Convex Optimization", Cambridge University Press 2004.). A simple approximate solution to this problem can be found as follows: find the eigenvector corresponding to the smallest eigenvalue of matrix $P^T W P$, then apply the sign function to the eigenvector to get an approximate solution for x vector (sign function assigns +1 to any positive value and −1 to any negative value; for a zero randomly choose either +1 or −1).

The regular sign function does not consider how close the values are to zero. By using a soft sign function, and considering the real values of elements in the eigenvector the solution can be further refined. For example, if an element is 3.2, there is higher confidence that it should be +1 compared to an element which is 0.001. The solution is therefore refined according to the following procedure, but is not so limited: sort the elements of the eigenvector according to their values; swap each bit in the solution (+1 to −1 and vice versa) from the smallest value to the largest and check for any improvement; if a swapped solution is better, keep it and check the next element; otherwise keep the original value. The number of swaps is in the order of node number and not exponential in N.

Upon completion of the first approximation phase, the adaptive weighting phase assigns different weights to different nodes in the network. This normalizes the effect of the number of parents and also gives different importance to the constraints of different nodes. If a node has fewer parents this node's requirement is harder to satisfy. For example, the only acceptable value for $z_n$ for a node with only two parents is zero, but if there are ten (10) parents the value of $z_n$ can be even +9 or −9. Initially the weight values are set as $$w_n = 1/|P_n|^2,$$

where $|P_n|$ shows the number of potential parents of node n.

After finding an approximate solution, the coloring algorithm checks the solution. If the approximate solution satisfies all the conditions and all the nodes have one red and one blue parent, the algorithm stops and returns the solution. If the solution is not valid, the coloring algorithm increases the weight of the nodes whose parents are all of the same color, and re-computes the solution by finding the eigenvector of the new matrix. In this way, the coloring algorithm adaptively assigns more weight to the nodes that are causing problem and have stricter requirements.

If after some pre-specified number of iterations no satisfactory solution can be found, the layer of some of the nodes contributing to the inability to find a solution can be increased. These nodes may be readily identified because the weight of these nodes is generally large, but is not so limited. By assigning a higher layer to a node, the number of possible parents of the node can be increased and therefore make it easier for the node to find two different colored parents. For example, a node in layer 3 can only have layer 2 nodes as its parents, but if this node moves to layer 4, it can have both its layer 2 and layer 3 neighbors as potential parents. After layer-reassignment the coloring algorithm is run again with the new layer values.

A drawback of increasing the layer of a node is that it can possibly affect the layer of its children and descendant nodes in the graph, and therefore the maximum number of layers (parameter h) in the network may also increase. To avoid this situation, the coloring algorithm of an embodiment ensures that after layer re-assignment the maximum layer remains the same.

Simulations were run on the coloring algorithm of an embodiment using implementations in both Matlab and C++. The coloring algorithm was run on many instances of randomly generated graphs. Random geometric graphs (see e.g., M. Penrose, "Random Geometric Graphs," Oxford Studies in Probability, May 2003) were used to model the connectivity graph, and in the generated graphs all nodes had at least two neighbors. FIG. 9 is a table 900 that includes the performance of the different phases of the coloring algorithm, under an embodiment. The simulation results of the table 900 are for N=100. The first row 901 shows the average number of neighbors of the nodes in the network. The second row 902 shows the average number of parents per node. The first level nodes are excluded in computing the average number of parents. The values in the third 903, fourth 904, fifth 905, and sixth 906 rows of the table show the percentage of graphs for which no valid coloring could be found. Even if one node did not get two differently colored parents, the coloring was considered invalid. The simulation results show that the first approximation does not find a valid solution for almost 90% of the graph instances, but adding the adaptive weighting described herein reduces the percentage of graphs with no solution to approximately seven percent (7%). With phase three (3), the soft sign function, no solution is found for only less than 0.6% of the graphs. Almost all graphs can be colored when layer re-assignment is used.

There may be scenarios for which no valid coloring can be found for a particular graph. For example, if the graph has an orphan node that only has one potential parent, no coloring is valid. In this case, the solution is to either color the parent of the orphan node purple which increases the power consumed by the parent, or accept more delay for the messages sent by or received by the orphan node.

Figure 10:
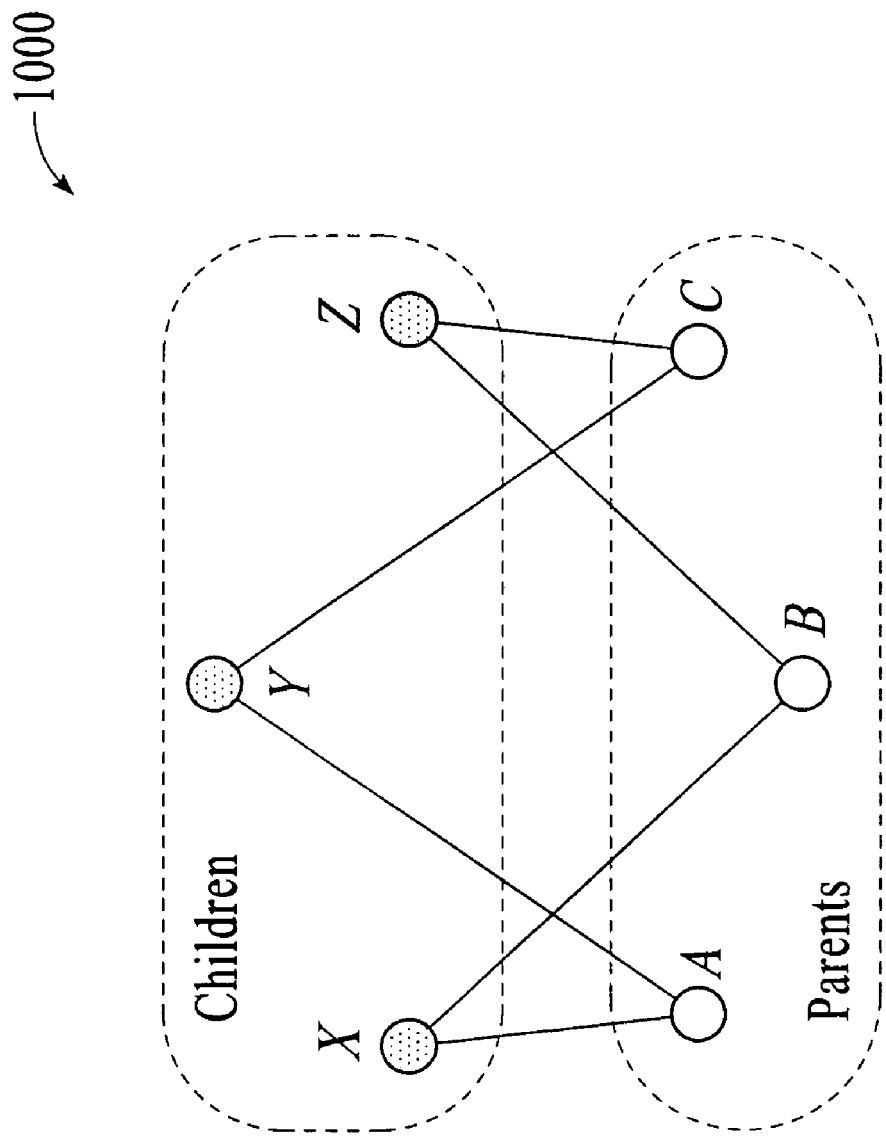
FIG. 10 shows an example of a graph with no valid coloring.

Other than the case of the orphan nodes, the graph topology can be such that no coloring can be found. FIG. 10 shows an example of a graph 1000 with no valid coloring. Nodes A, B, and C are the parent nodes and Nodes X, Y, and Z are the children nodes. No coloring of the parent nodes can satisfy all the children nodes. For example, if Nodes A and B are red and Node C is blue, then Node X does not have any blue parent node. Such topology is very unlikely and it can usually be avoided by increasing the layer of one the three children unless the children are already in the highest allowable layer. Even in such a case where we have to color one of the nodes purple, any of the parent nodes A, B or C can become purple and solve the problem. In this situation, the color of the nodes can be changed over time so that each of the three parents is alternately colored purple over different periods of time. In this way, the extra energy consumed by the purple node is distributed over the three nodes.

Figure 11:
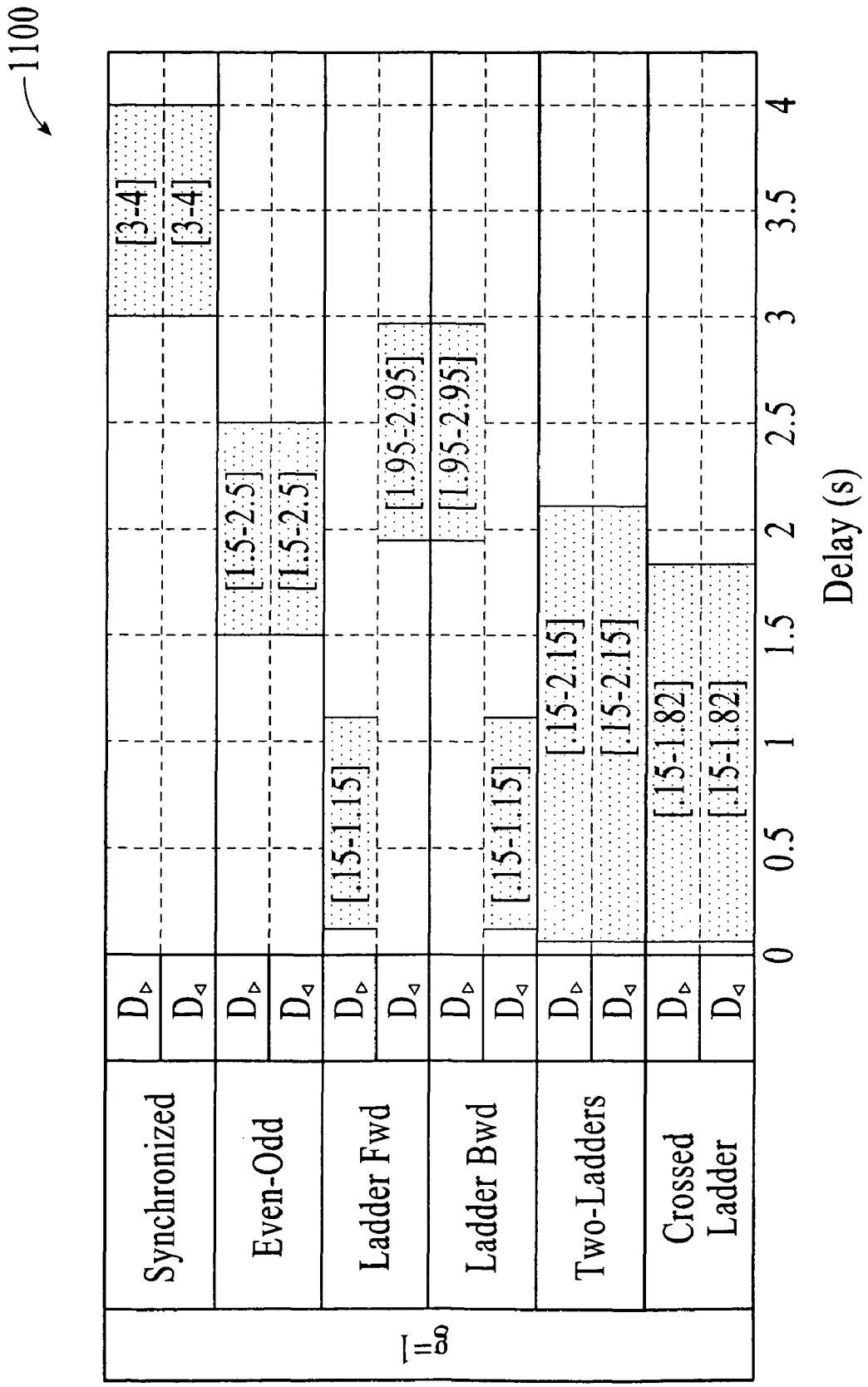
FIG. 11 shows a delay distribution for the crossed ladder wakeup pattern (g=1) compared with various other wakeup patterns, under an embodiment.

FIG. 11 shows a delay distribution 1100 for the crossed ladder wakeup pattern compared with various other wakeup patterns, under an embodiment. The conditions under which these results were obtained are as follows: $T_{\mathit{eff}}=1$ s; h=4 hops network; τ=50 ms; and g=1. For each pattern there are two rows which respectively show the distribution of the delay in forward and backward directions. The shaded region illustrates the approximate range of the delay from minimum value to maximum value. For example, these results show that the delay of the crossed ladders pattern is uniformly distributed between approximately 0.15 s to 1.82 s in both forward and backward directions, but is not so limited. Since $T_{\mathit{eff}}$ is constant, the power consumption for all schemes is the same. The synchronized pattern has the worst delay (4 s) and the crossed pattern has the best overall delay in both directions (1.82 s).

Figure 12:
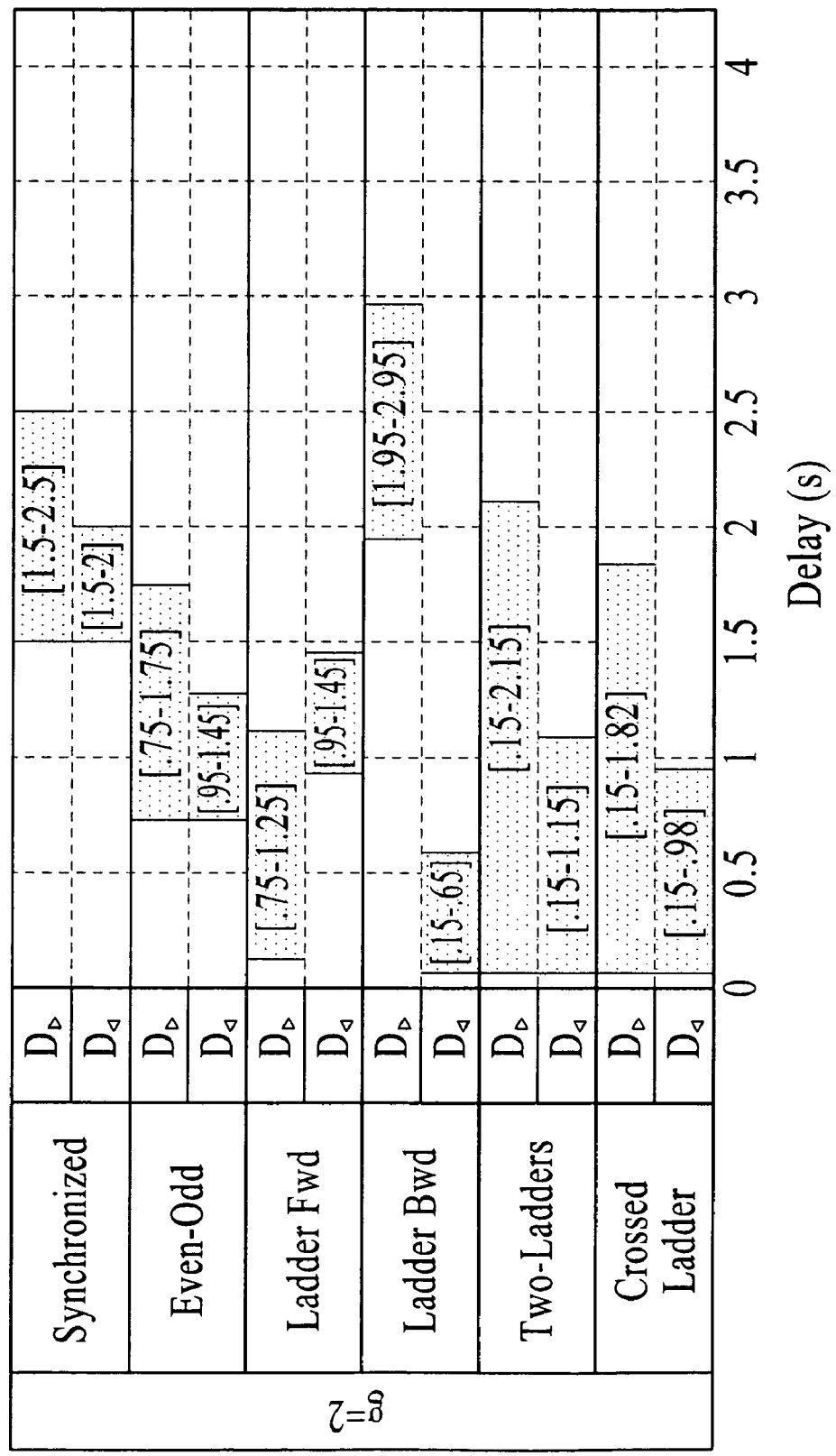
FIG. 12 shows a delay distribution 1200 for the crossed ladder wakeup pattern (g=2) compared with various other wakeup patterns, under an embodiment.

FIG. 12 shows a delay distribution 1200 for the crossed ladder wakeup pattern compared with various other wakeup patterns, under an embodiment. The conditions under which these results were obtained are as follows: $T_{\mathit{eff}}=1$ s; h=4 hops network; τ=50 ms; and g=2. The power consumption of all these schemes for both g=1 and g=2 remains the same, as $T_{\mathit{eff}}$ is fixed. By increasing g from a value of one (1) to a value of two (2) for the same wakeup pattern, the backward delay is notably reduced, but the forward delay remains the same except for the fully synchronized and even-odd patterns. For example, maximum backward delay for the crossed-ladders pattern with g=1 is 1.82 s which is reduced to 0.98 with g=2.

The node control of an embodiment includes a method comprising sequentially controlling nodes of a network into an active state from an inactive state. The nodes of the network include a plurality of nodes and a crossing node. Sequentially controlling includes placing each node of the plurality of nodes in the active state at least twice during a time period and placing the crossing node in the active state once during the time period. Sequentially controlling includes staggering initiation of the active state for the nodes.

Staggering initiation of the active state for the nodes of an embodiment further comprises using a time difference between initiation of the active state for each of the nodes.

Sequentially controlling of an embodiment further comprises controlling the initiation of the active state according to a pattern.

The method of an embodiment further comprises alternating the pattern among a plurality of patterns according to an adaptive time period.

The pattern of an embodiment controls the nodes so that a different one of the nodes is the crossing node during different adaptive time periods.

The node control of an embodiment includes a method comprising one or more of dividing a plurality of nodes of a network into a plurality of groups, assigning to each node of the plurality of nodes a parent node from each of the plurality of groups, wherein the parent node watches over a node to which the parent node is assigned, and controlling the plurality of nodes into an active state by alternately placing nodes into an active state according to the group to which the node is assigned.

The dividing of an embodiment further comprises placing a node having a plurality of connections to other nodes in the network in one of a first group and a second group. The controlling of an embodiment further comprises alternately placing nodes of the first group and the second group into the active state.

The dividing of an embodiment further comprises placing a node having one connection to another node in the network in a third group. The controlling of an embodiment further comprises placing nodes of the third group into the active state approximately simultaneously with the placing of nodes of the first group and the second group into the active state.

The method of an embodiment further comprises one or more of receiving a message at a base station and determining a destination node of the message, determining a group to which the destination node belongs, and transferring the message through the network via nodes of the group to which the destination node belongs.

The method of an embodiment further comprises one or more of identifying a node having a message for transmission through the network to a base station, identifying a parent node of the identified node that is the next parent node to be placed into the active state, and transferring the message to the identified parent node.

Controlling the plurality of nodes into an active state of an embodiment further comprises sequentially placing the nodes into an active state from an inactive state, wherein the plurality of nodes consists of a set of nodes and a crossing node, wherein controlling includes placing each node of the set of nodes in the active state at least twice during a time period and placing the crossing node in the active state once during the time period.

Alternately placing nodes of an embodiment into an active state includes staggering initiation of the active state for the nodes.

The node control of an embodiment includes a system comprising a plurality of nodes. At least one node of the plurality of nodes is coupled to at least one other node of the plurality of nodes to form at least one network. A crossing node is coupled to at least one of the plurality of nodes, wherein the crossing node is a member of the at least one network. A controller is coupled to at least one of the plurality of nodes and the crossing node. The controller is configured to sequentially control the plurality of nodes and the crossing node into an active state from an inactive state. Sequentially controlling includes placing each node of the plurality of nodes in the active state at least twice during a time period and placing the crossing node in the active state once during the time period. Sequentially controlling includes staggering initiation of the active state for the plurality of nodes and the crossing node.

The controller of an embodiment is further configured so that staggering initiation of the active state for the plurality of nodes and the crossing node further comprises using a time difference between initiation of the active state for each of the plurality of nodes and the crossing node.

The controller of an embodiment is further configured so that sequentially controlling further comprises controlling the initiation of the active state according to a pattern.

The controller of an embodiment is further configured to alternate the pattern among a plurality of patterns according to an adaptive time period, wherein the pattern controls the nodes so that a different one of the nodes is the crossing node during different adaptive time periods.

The node control of an embodiment includes a system comprising a plurality of nodes, wherein at least one node of the plurality of nodes is coupled to at least one other node of the plurality of nodes to form at least one network. The plurality of nodes is divided into a plurality of groups, wherein a parent node from each of the plurality of groups is assigned to each node of the plurality of nodes. The parent node watches over a node to which the parent node is assigned. A controller is coupled to at least one of the plurality of nodes. The controller is configured to control the plurality of nodes into an active state by alternately placing nodes into an active state according to the group to which the node is assigned.

The plurality of nodes of an embodiment is divided by placing a node having a plurality of connections to other nodes in the network in one of a first group and a second group, wherein controlling further comprises alternately placing nodes of the first group and the second group into the active state.

The plurality of nodes of an embodiment is divided by placing a node having one connection to another node in the network in a third group, wherein controlling further comprises placing nodes of the third group into the active state approximately simultaneously with the placing of nodes of the first group and the second group into the active state.

One or more of the plurality of nodes and the controller of an embodiment is configured to receive a message at a base station and determine a destination node of the message, determine a group to which the destination node belongs, and transfer the message through the network via nodes of the group to which the destination node belongs.

One or more of the plurality of nodes and the controller of an embodiment is configured to identify a node having a message for transmission through the network to a base station, identify a parent node of the identified node that is the next parent node to be placed into the active state, and transfer the message to the identified parent node.

Aspects of the node control described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the node control include: microcontrollers with memory (such as electronically erasable programmable read only memory (EEPROM)), embedded microprocessors, firmware, software, etc. Furthermore, aspects of the node control may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components disclosed herein may be described and expressed (or represented) as data and/or instructions embodied in various computer-readable media. Computer-readable media in which such data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the node control is not intended to be exhaustive or to limit the node control to the precise form disclosed. While specific embodiments of, and examples for, the node control are described herein for illustrative purposes, various equivalent modifications are possible within the scope of the node control, as those skilled in the relevant art will recognize. The teachings of the node control provided herein can be applied to other processing systems and methods, not only for the systems and methods described above.

The elements and acts of the various embodiments described above can be combined to provide further embodiments. These and other changes can be made to the node control in light of the above detailed description.

In general, in the following claims, the terms used should not be construed to limit the node control to the specific embodiments disclosed in the specification and the claims, but should be construed to include all processing systems that operate under the claims. Accordingly, the node control is not limited by the disclosure, but instead the scope of the node control is to be determined entirely by the claims.

While certain aspects of the node control are presented below in certain claim forms, the inventors contemplate the various aspects of the node control in any number of claim forms. For example, while only one aspect of the node control is recited as embodied in machine-readable medium, other aspects may likewise be embodied in machine-readable medium. Accordingly, the inventors reserve the right to add additional claims after filing the application to pursue such additional claim forms for other aspects of the node control.

What is claimed is:

1. A method for a communication system comprising sequentially controlling nodes of a network into an active state from an inactive state, wherein the nodes of the network include a plurality of nodes and at least one crossing node, wherein sequentially controlling includes placing each node of the plurality of nodes in the active state at least twice during a given time period and placing the at least one crossing node in the active state once during the given time period, wherein sequentially controlling includes staggering initiation of the active state for the nodes, comprises:
using a crossed ladders wakeup pattern to selectively wakeup nodes at node levels by designating a first node level in the network as a crossing node level that includes a first crossing node and placing the first crossing node in the active state once during a first time period based in part on the combining of two wakeups of a second node level; and
using the crossed ladders wakeup pattern to designate a third node level in the network as another crossing node level that includes a second crossing node and placing the second crossing node in the active state once during a second time period based in part on the combining of two wakeups of a fourth level as part of changing the node level designated as the crossing node level during the second time period.

2. The method of claim 1, wherein staggering initiation of the active state for the nodes further comprises using a time difference between initiation of the active state for each of the nodes.

3. The method of claim 1, wherein sequentially controlling further comprises controlling the initiation of the active state according to a pattern.

4. The method of claim 3, further comprising alternating the pattern among a plurality of patterns according to an adaptive time period.

5. The method of claim 4, wherein the pattern controls the nodes so that a different one of the nodes is the crossing node during different adaptive time periods.

6. The method of claim 1 further comprising:
dividing the plurality of nodes of the network into a plurality of groups; and
assigning to each node of the plurality of nodes at least one parent node from each of the plurality of groups, wherein a parent node watches over a node to which the parent node is assigned.

7. The method of claim 6, wherein dividing further comprises placing a node having a plurality of connections to other nodes in the network in one of a first group and a second group.

8. The method of claim 7, wherein dividing further comprises placing a node having one connection to another node in the network in a third group.

9. The method of claim 6, further comprising:
receiving a message at a base station and determining a destination node of the message;
determining a group to which the destination node belongs; and
transferring the message through the network via nodes of the group to which the destination node belongs.

10. The method of claim 6, further comprising:
identifying a node having a message for transmission through the network to a base station;
identifying a parent node of the identified node that is the next parent node to be placed into the active state; and
transferring the message to the identified parent node.

11. A method for a communication system comprising:
dividing a plurality of nodes of a network into a plurality of groups, including a plurality of crossing nodes;
assigning to each node of the plurality of nodes at least one parent node from each of the plurality of groups, wherein a parent node watches over a node to which the parent node is assigned;
controlling the plurality of nodes into an active state by alternately placing nodes into an active state according to the group to which the node is assigned including using a crossed ladders wakeup pattern to selectively wakeup nodes at node levels by placing a first crossing node of a first node level in the active state once during a first time period and placing a second crossing node of a second node level in the active state once during a second time period, a crossing node wakeup based in part on the combining two wakeups of a second node level, wherein controlling the plurality of nodes into an active state further comprises sequentially placing the nodes into an active state from an inactive state, wherein the plurality of nodes consists of a set of nodes and a crossing node, wherein controlling includes placing each node of the set of nodes in the active state at least twice during a time period and placing the crossing node in the active state at least once during the time period; and
periodically reassigning each of the plurality of nodes.

12. The method of claim 11, wherein alternately placing nodes into an active state includes staggering initiation of the active states for the nodes.

13. A system comprising:
a plurality of nodes, wherein at least one node of the plurality of nodes is coupled to at least one other node of the plurality of nodes to form at least one network;
at least one crossing node that is coupled to at least one of the plurality of nodes, wherein the at least one crossing node is a member of the at least one network; and
a controller coupled to at least one of the plurality of nodes and the at least one crossing node, the controller configured to sequentially control the plurality of nodes and the crossing node into an active state from an inactive state, wherein sequentially controlling includes placing each node of the plurality of nodes in the active state at least twice during a given time period and placing the at least one crossing node in the active state once during the time period, wherein sequentially controlling includes staggering initiation of the active state for the plurality of nodes and the at least one crossing node and comprises:
using a crossed ladders wakeup pattern to selectively wakeup nodes at node levels by designating a first node level in the network as a crossing node level that includes a first crossing node and placing the first crossing node in the active state once during a first time period; and using the crossed ladders wakeup pattern to designate a third node level in the network as another crossing node level that includes a second crossing node and placing he second crossing node in the active state once during a second time period based in part on the combining of two wakeups of a fourth level as part of changing the node level designated as the crossing node level during the second time period.

14. The system of claim 13, wherein the controller is further configured so that staggering initiation of the active state for the plurality of nodes and the at least one crossing node further comprises using a time difference between initiation of the active state for each of the plurality of nodes and the at least one crossing node.

15. The system of claim 13, wherein the controller is further configured so that sequentially controlling further comprises controlling the initiation of the active state according to a pattern.

16. The system of claim 15, wherein the controller is further configured to alternate the pattern among a plurality of patterns according to an adaptive time period, wherein the pattern controls the nodes so that a different one of the nodes is the at least one crossing node during different adaptive time periods.

* * * * *